US011339789B2

(12) United States Patent
Webster et al.

(10) Patent No.: US 11,339,789 B2
(45) Date of Patent: May 24, 2022

(54) DIFFUSER ANTI-ROTATION SYSTEM AND APPARATUS

(71) Applicant: Halliburton Energy Services, Inc., Houston, TX (US)

(72) Inventors: Joshua Wayne Webster, Owasso, OK (US); Wesley John Nowitzki, Tulsa, OK (US); Randy S. Roberts, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 481 days.

(21) Appl. No.: 16/345,154

(22) PCT Filed: Feb. 8, 2018

(86) PCT No.: PCT/US2018/017443

§ 371 (c)(1),
(2) Date: Apr. 25, 2019

(87) PCT Pub. No.: WO2018/148423

PCT Pub. Date: Aug. 16, 2018

(65) Prior Publication Data

US 2019/0285071 A1 Sep. 19, 2019

Related U.S. Application Data

(60) Provisional application No. 62/458,263, filed on Feb. 13, 2017.

(51) Int. Cl.
*F04D 13/10* (2006.01)
*F04D 29/62* (2006.01)
(Continued)

(52) U.S. Cl.
CPC ........... *F04D 13/10* (2013.01); *F04D 29/628* (2013.01); *F04D 1/063* (2013.01); *F04D 29/445* (2013.01); *F05D 2260/36* (2013.01)

(58) Field of Classification Search
CPC ...... F04D 29/628; F04D 1/063; F04D 29/445; F04D 13/10; F04D 1/06; F04D 1/066;
(Continued)

(56) References Cited

U.S. PATENT DOCUMENTS 3,265,001 A 8/1966 Deters
4,512,596 A * 4/1985 Obrecht ............... E21B 17/043 285/81

(Continued)

OTHER PUBLICATIONS

Extended Search Report in EP Application No. 18751474.0, dated Jun. 25, 2020.

(Continued)

*Primary Examiner* — Kenneth Bomberg
*Assistant Examiner* — Adam W Brown
(74) *Attorney, Agent, or Firm* — McGuireWoods LLP

(57) ABSTRACT

A diffuser anti-rotation system and apparatus is described. A diffuser anti-rotation system includes a circumferential coupling ring interlocked between a top of a first diffuser and a bottom of an adjacent diffuser. One end of the first diffuser includes at least one male register tab, the opposing end of the adjacent diffuser has at least one female register slot, and the coupling ring interlocks with the male register tab and the female register slot. One of the male register tabs and one of the female register slots are aligned axially and a single projection from the coupling ring interlocks with both the male register tab and the axially aligned female register slot. Impellers are mated with and rotating within each of the first diffuser and the adjacent diffuser, and the interlocked coupling ring prevents rotation of the first diffuser with respect to the adjacent diffuser.

16 Claims, 9 Drawing Sheets

(51) Int. Cl.
*F04D 1/06* (2006.01)
*F04D 29/44* (2006.01)

(58) Field of Classification Search
CPC ............... F04D 13/0613; F04D 17/125; F04D 25/0686; F05D 2260/36; F05D 2230/64; F05D 2260/30; F05D 2260/33
See application file for complete search history.

(56) References Cited

U.S. PATENT DOCUMENTS

| | | | | |
|---|---|---|---|---|
| 4,625,798 | A * | 12/1986 | Bayh, III | E21B 43/12 166/106 |
| 5,474,334 | A * | 12/1995 | Eppink | E21B 7/067 175/74 |
| 5,714,062 | A * | 2/1998 | Winkler | B01F 3/04262 210/220 |
| 5,839,205 | A | 11/1998 | Hung | |
| 6,557,905 | B2 * | 5/2003 | Mack | F04D 29/044 285/330 |
| 6,726,449 | B2 * | 4/2004 | James | F04D 1/063 415/199.2 |
| 7,493,960 | B2 * | 2/2009 | Leising | E21B 17/04 166/242.6 |
| 7,887,098 | B2 * | 2/2011 | Aas | F16L 15/08 285/92 |
| 8,043,051 | B2 * | 10/2011 | Brunner | F04D 29/628 415/170.1 |
| 8,678,758 | B2 * | 3/2014 | Orban | F04D 29/2294 415/199.2 |
| 9,133,968 | B2 * | 9/2015 | Elrick | F16L 19/0225 |
| 10,533,578 | B2 * | 1/2020 | Johnson | E21B 43/128 |
| 10,683,868 | B2 * | 6/2020 | Nowitzki | F04D 13/10 |
| 2003/0185676 | A1 | 10/2003 | James et al. | |
| 2008/0286135 | A1 | 11/2008 | Yoshida et al. | |
| 2008/0292454 | A1 | 11/2008 | Brunner | |
| 2009/0285678 | A1 | 11/2009 | Brunner et al. | |
| 2013/0340245 | A1 * | 12/2013 | Watson | F04D 13/10 29/592.1 |
| 2015/0071799 | A1 * | 3/2015 | Johnson | F04D 29/0413 417/423.3 |
| 2017/0102009 | A1 | 4/2017 | Johnson et al. | |

OTHER PUBLICATIONS

International Search Report and Written Opinion dated May 28, 2018; International PCT Application No. PCT/US2018/017443.

* cited by examiner

DIFFUSER ANTI-ROTATION SYSTEM AND APPARATUS

BACKGROUND

1. Field of the Invention

Embodiments of the invention described herein pertain to the field of electric submersible pump diffusers. More particularly, but not by way of limitation, one or more embodiments of the invention enable a diffuser anti-rotation system and apparatus.

2. Description of the Related Art

Fluid, such as gas, oil or water, is often located in underground formations. When pressure within the well is not enough to force fluid out of the well, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser that sits outward of the impeller. A rotating shaft runs through the central hub of the impeller and diffuser. The pump's motor turns the pump shaft, and the impeller is keyed to the pump shaft, causing the impeller to rotate with the shaft. In multistage centrifugal pumps, multiple impeller and diffuser stages are stacked one above the other around the pump shaft, with each successive diffuser sitting on a diffuser of the previous stage.

A conventional vertical ESP assembly includes, from bottom to top, a motor, seal section, intake section, and multi-stage centrifugal pump. Production tubing carries the pumped fluid from the centrifugal pump to the well's surface. The assembly components each have a shaft running longitudinally through their centers that are connected and rotated by the motor. In gassy wells, a gas separator or charge pump may also be included in the assembly, typically between the intake and the pump, or in place of the intake. For example, a gas separator may act as the intake of the assembly. In such instances, the gas separator compresses the gaseous fluid and then attempts to separate any unsaturated gas before the fluid passes into the centrifugal pump. Gas separators sometimes include impeller and diffuser stages to increase the pressure of the fluid during compression and separation of gases. Similarly, charge pumps are also sometimes used in tandem with a primary centrifugal pump in gassy wells, and may also employ stages.

Conventional diffusers have an overlapping locating-feature to allow for stacking of the diffusers. The overlapping feature consists of a female and male register that mate together. The female register is located around the circumference of one end of a diffuser and fits around the male register on the opposing end of the adjacent diffuser. FIG. 1A illustrates a conventional diffuser 100 with conventional male register 105 of the prior art. FIG. 1B illustrates conventional diffuser 100 with conventional female register 110 of the prior art. Typically, conventional female register 110 has a slightly larger inner diameter than the outer diameter of the conventional male register 105. In one example, if the inner diameter of the conventional female register 110 is 4.616 inches (11.725 cm), the outer diameter of the conventional male register 105 will be about 4.612 inches (11.714 cm), such that the conventional male register 105 of one conventional diffuser 100 fits inside the conventional female register 110 of an adjacent conventional diffuser 100. The stack of diffusers is held in compression by friction, which keeps the diffusers from spinning despite the fast-rotating impellers within the diffusers. A bearing threads into the pump housing, compressing the diffusers from the top of the stack.

Diffusers in multi-stage centrifugal pumps should not rotate. If the diffusers spin, the ESP pump loses its pressure lift and fails to produce fluid to the surface of a well. A problem that arises in high temperature or gassy wells, is that thermal expansion within the pump assembly can result in lost compression on the diffuser stack, allowing for diffuser spin. For example, in gassy wells, less cooling fluid passes through the pump, causing the pump to run hotter than wells with more liquid. In another example, steam assisted gravity drainage (SAGD) wells operate with injected steam raising the well temperature to temperatures of up to 550° F. (287.8° C.). In general, ESP pump assemblies operating above 300° F. may experience production problems resulting from diffuser spin.

To date, some attempts have been made to mechanically lock diffusers together in a stack in order to prevent spin. However, these mechanical lock attempts suffer from the drawback of creating complicated casting geometries or difficult machining operations that are costly and impractical to implement.

As is apparent from the above, current approaches to prevent diffuser rotation in ESP stages are inadequate. Therefore, there is a need for an improved diffuser anti-rotation system and apparatus.

SUMMARY

One or more embodiments of the invention relate generally to a diffuser anti-rotation system and apparatus.

A diffuser anti-rotation system and apparatus is described. An illustrative embodiment of a centrifugal pump includes at least two diffusers including a first diffuser and a second diffuser, the first diffuser adjacent the second diffuser, each of the first diffuser and the second diffuser including a first end including a plurality of male register tabs dispersed around the first end, and a second end including a plurality of female register slots dispersed around the second end, a coupling ring extending circumferentially between the first diffuser and the second diffuser, the coupling ring including a plurality of projections, each projection of the plurality of projections mated around one of the male register tabs of the first diffuser, and inside one of the female register slots of the second diffuser. In some embodiments, the centrifugal pump further includes a first impeller rotating with a shaft of the centrifugal pump inside the first diffuser, and a second impeller rotating with the shaft of the centrifugal pump inside the second diffuser. In certain embodiments, the coupling ring interlocks the first diffuser and the second diffuser against rotation. In some embodiments, the coupling ring is configured to prevent rotation of the first diffuser with respect to the second diffuser. In certain embodiments, a radially extending portion of each projection of the coupling ring abuts a wall of the one of the male register tabs on a first side of the radially extending portion, and abuts a wall of the one of the female register slots on a second side of the radially extending portion. In some embodiments, each projection includes an arch, and an intrados of the arch surrounds the male register tab of the first diffuser, and an extrados of the arch is flush with and follows an outer diameter of the first diffuser. In certain embodiments, the coupling ring seats around a circumference of a rim of one of the first diffuser or the second diffuser. In some embodiments, the at least two diffusers are compressed in a stack. In certain embodiments, there are two male register tabs in the plurality of male register tabs spaced 180° apart, two female register slots in the plurality of female register slots and two protrusions in the plurality of protrusions. In some embodiments, each male register tab is axially aligned with a female register slot.

An illustrative embodiment of a diffuser anti-rotation system includes a circumferential coupling ring interlocked between a top of a first diffuser and a bottom of an adjacent diffuser. In some embodiments, the top of the first diffuser includes at least one male register tab, the bottom of the adjacent diffuser has at least one female register slot, and the coupling ring interlocks with the at least one male register tab and the at least one female register slot. In certain embodiments, one of the at least one male register tabs and one of the at least one female register slots are aligned axially and one projection from the coupling ring interlocks with both the one of the at least one male register tabs and the axially aligned one of the at least one female register slots. In some embodiments, the one projection mates around the one of the at least one male register tabs and inside the one of the at least one female register slots. In certain embodiments, the diffuser anti-rotation system further includes a first impeller mated with and rotating within the first diffuser, and a second impeller mated with and rotating within the adjacent diffuser. In some embodiments, the interlocked coupling ring is configured to prevent rotation of the first diffuser with respect to the adjacent diffuser. In certain embodiments, the diffusers with mated impellers form a multi-stage centrifugal pump. In some embodiments, the diffuser anti-rotation system further includes a plurality of first diffusers and a plurality of adjacent diffusers forming a diffuser stack compressed by a centralizer bearing. In some embodiments, the bottom of the first diffuser includes at least one male register tab, the top of the adjacent diffuser has at least one female register slot, and the coupling ring interlocks with the at least one male register tab and the at least one female register slot.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1A:
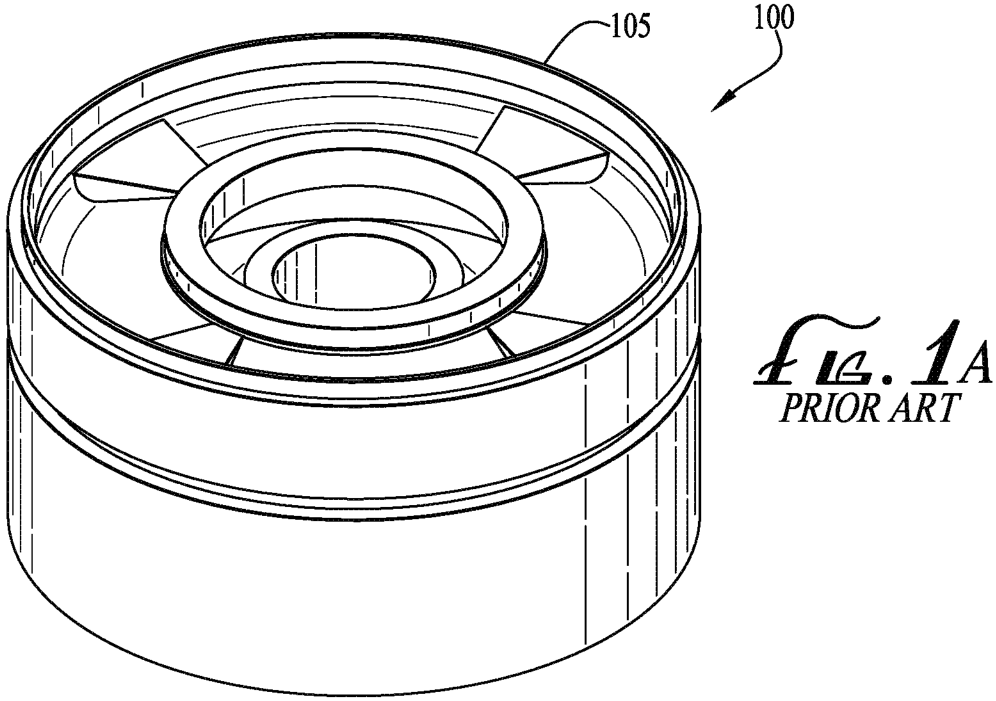
FIG. 1A PRIOR ART
FIG. 1A is a perspective view of a diffuser of the prior art illustrating a conventional male register.
Figure 1B:
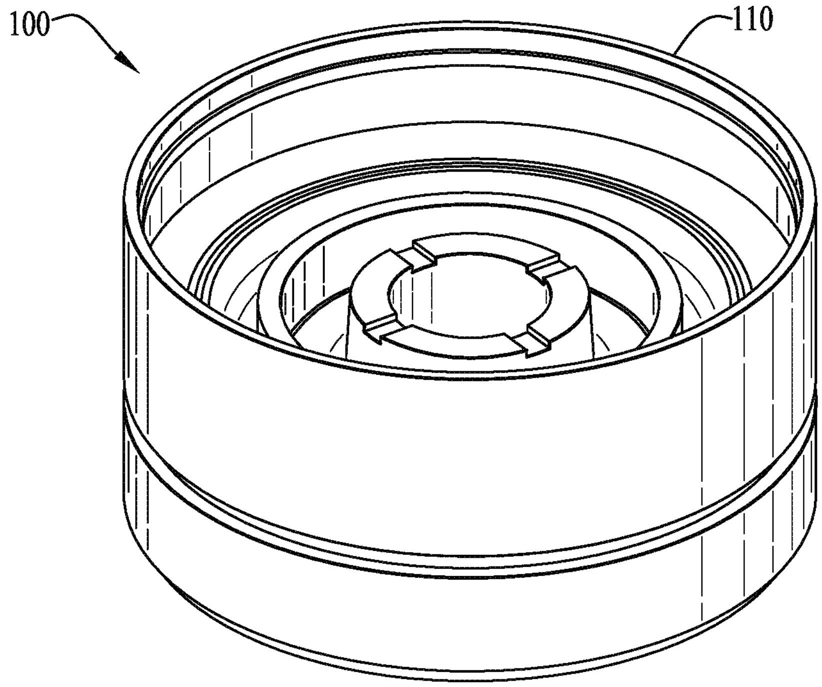
FIG. 1B PRIOR ART
FIG. 1B is a perspective view of a diffuser of the prior art illustrating a conventional female register.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A diffuser anti-rotation system and apparatus are described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a tab includes one or more tabs.

"Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of the electric submersible pump (ESP) assembly element and/or the opening of a component through which the shaft would extend. In the art, "outer diameter" and "outer circumference" are sometimes used equivalently. As used herein, the outer diameter is used to describe what might otherwise be called the outer circumference or outer surface of a pump component such as a diffuser.

As used herein, the term “inner”, “inside” or “inward” means the radial direction toward the center of the shaft of the ESP assembly element and/or the opening of a component through which the shaft would extend. In the art, “inner diameter” and “inner circumference” are sometimes used equivalently. As used herein, the inner diameter is used to describe what might otherwise be called the inner circumference or inner surface of a pump component, such as a coupling ring.

As used herein the terms “axial”, “axially”, “longitudinal” and “longitudinally” refer interchangeably to the direction extending along the length of the shaft of an ESP assembly component such as a multi-stage centrifugal pump, seal section, gas separator or charge pump.

“Downstream” refers to the longitudinal direction through a well substantially with the principal flow of lifted fluid when the pump assembly is in operation. By way of example but not limitation, in a vertical downhole ESP assembly, the downstream direction may be towards the surface of the well. The “top” of a component refers to the downstream-most side of the component. In that vein, a first diffuser that is “above” a second diffuser refers to the first diffuser being downstream of the second diffuser.

“Upstream” refers to the longitudinal direction through a well substantially opposite the principal flow of working fluid when the pump assembly is in operation. By way of example but not limitation, in a vertical downhole ESP assembly, the upstream direction may be opposite the surface of the well. The “bottom” of a component refers to the upstream-most side of the component. In that vein, a first diffuser that is “below” a second diffuser refers to the first diffuser being upstream of the second diffuser.

Illustrative embodiments of the invention described herein may prevent rotation of diffusers in ESP assembly stages, despite operation in gassy and/or high temperature wells that may reach up to 550° F. (287.8° C.). Illustrative embodiments may provide the advantage of a mechanical lock against diffuser spin that does not require complicated casting geometries or complex machining operations, thereby reducing the cost and feasibility of implementing the system of illustrative embodiments.

Illustrative embodiments include a diffuser coupling ring that may provide a mechanical lock between adjacent diffusers in a diffuser stack. The diffuser stack may be employed in stages in a centrifugal pump, gas separator or charge pump of an ESP assembly. One end of a diffuser, either the top or the bottom, may include male register tabs, while the opposing end may include female register slots. The diffuser coupling ring may include projections that interlock with both the male register tabs of a first diffuser and the female register slots of an adjacent diffuser. The interlocked coupling ring may prevent rotation of the diffusers despite high temperature conditions and fast-rotating impellers mated within the diffusers, such as impellers rotating at 3,500 revolutions per minute (rpm).

Figure 2:
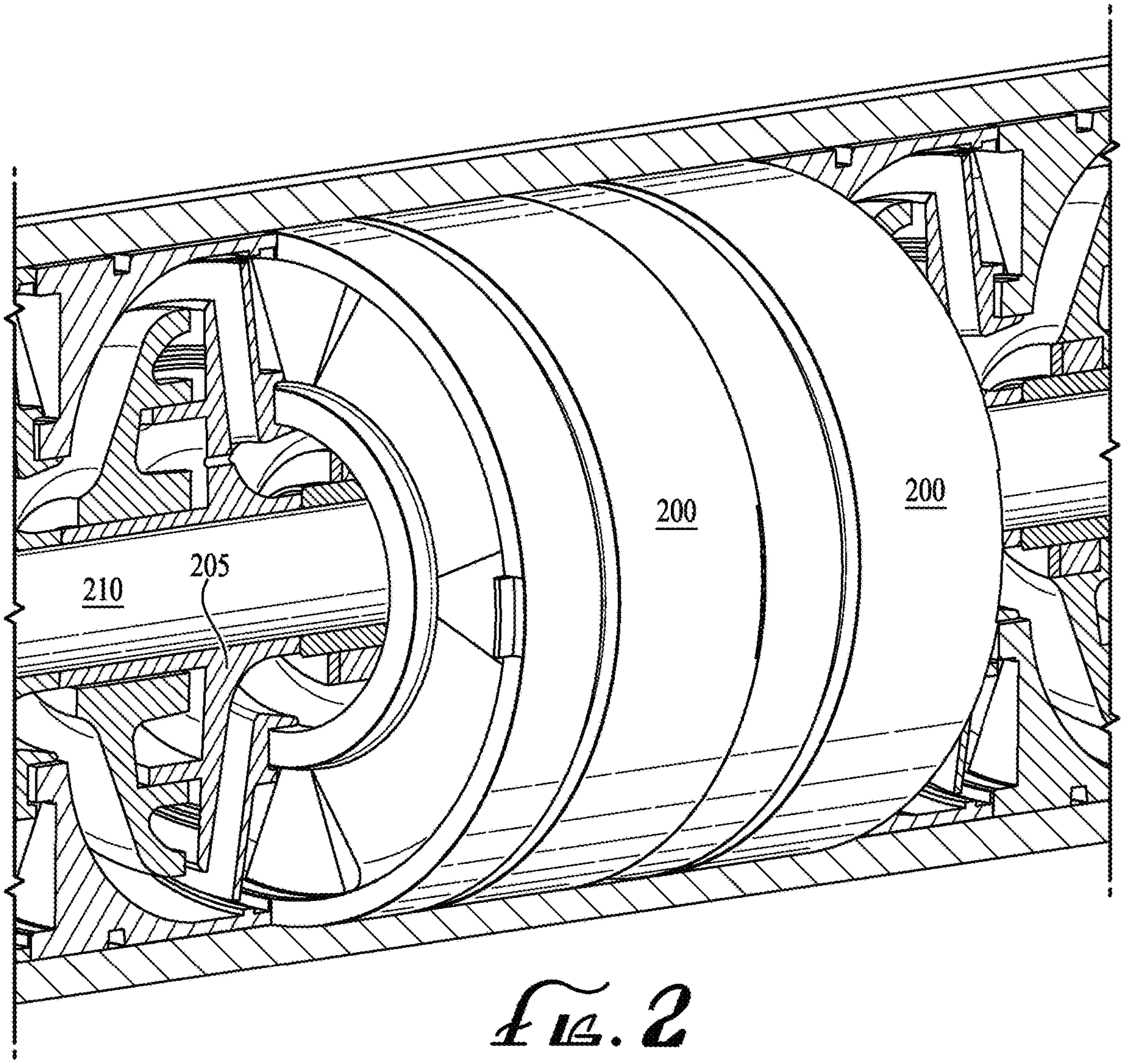
FIG. 2 is a cross sectional view of ESP assembly stages of an illustrative embodiment.
Figure 10:
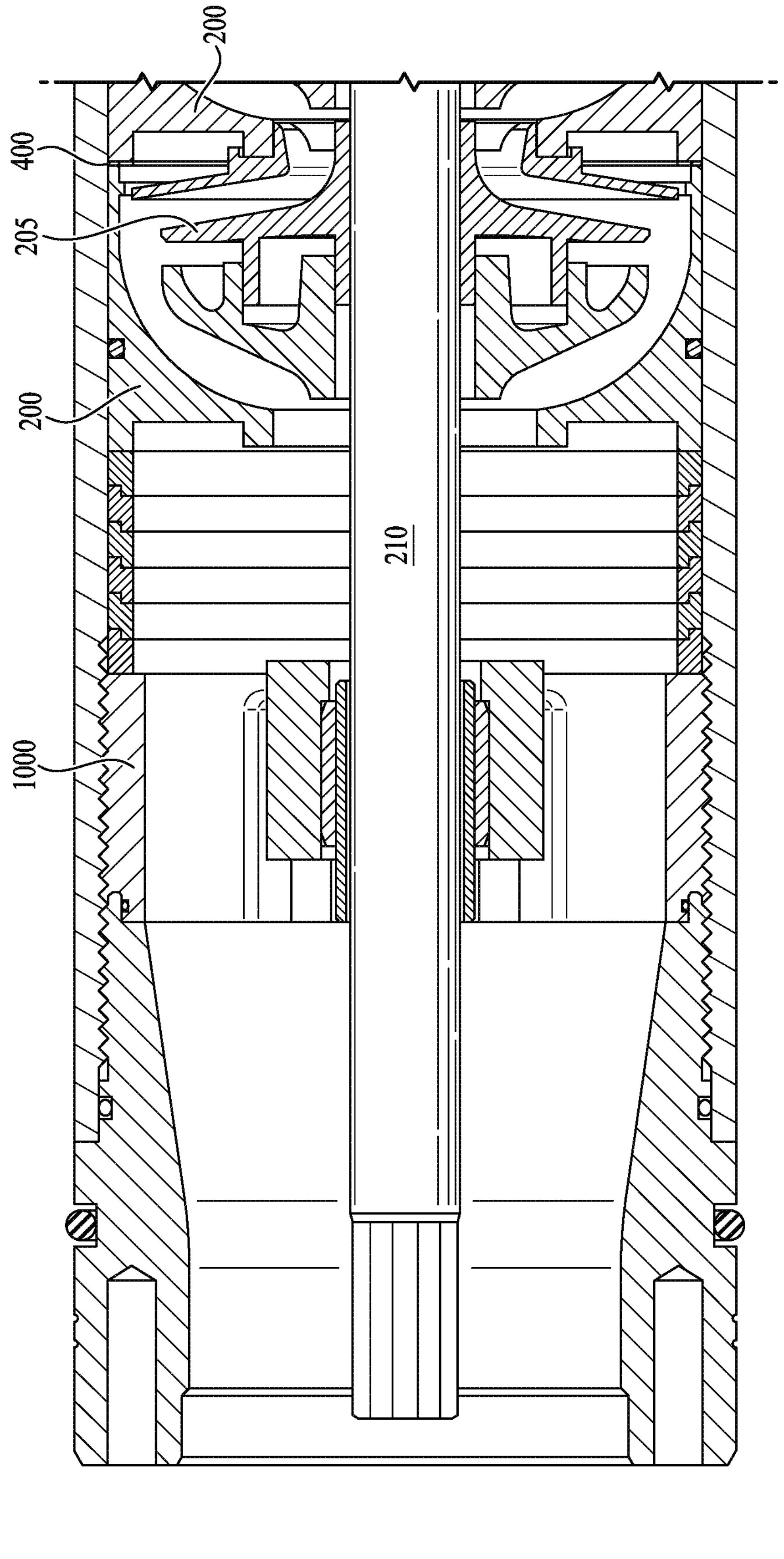
FIG. 10 is a cross sectional view of a diffuser stack of an illustrative embodiment.

FIG. 2 illustrates impeller and diffuser stages of an illustrative embodiment, for example centrifugal pump stages. Diffusers 200 may be stacked one above the other around shaft 210. Each diffuser 200 may be paired with an impeller 205 inward of diffuser 200, the impeller 205 rotating with shaft 210 during operation of the ESP pump. In FIG. 2, two diffusers 200 are shown. For ease of illustration and so as not to obscure the invention, illustrative embodiments refer to diffusers 100 stacked one “above” another, although the stack of diffusers 200 may be arranged vertically, extend through a radius, or extend horizontally in a well, such as in a steam-assisted graving drainage (SAGD) well. Stages of impeller 205 and diffuser 200 pairs may be stages of a centrifugal pump, charge pump or gas separator. As shown in FIG. 10, stack of diffusers 200 may include top centralizer bearing 1000 to assist in holding diffusers 200 in compression.

Figure 3A:
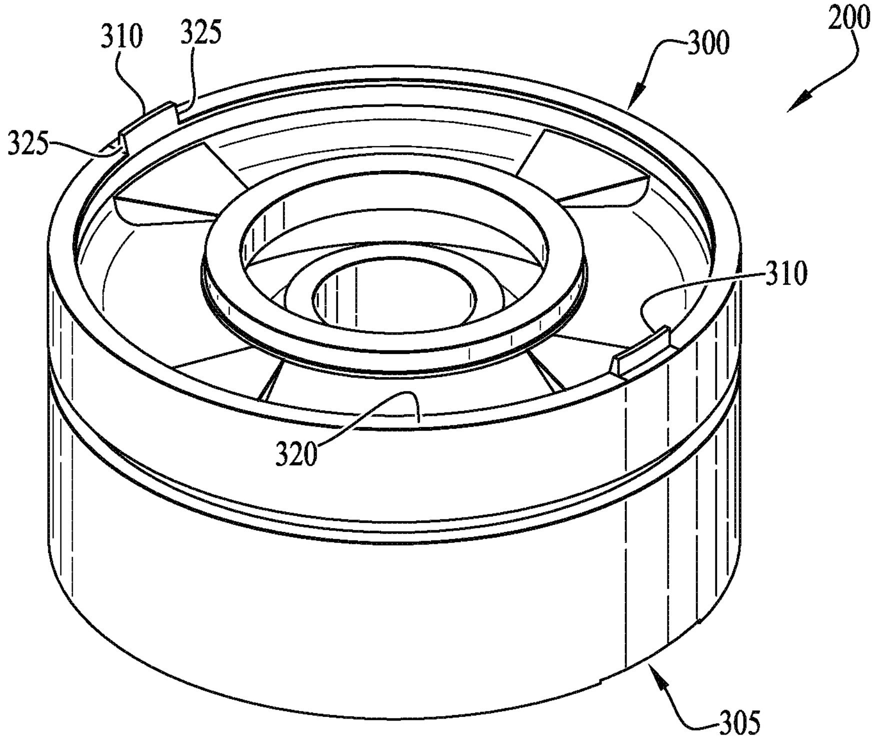
FIG. 3A is a perspective view of an exemplary diffuser with male register tabs of an illustrative embodiment.
Figure 3B:
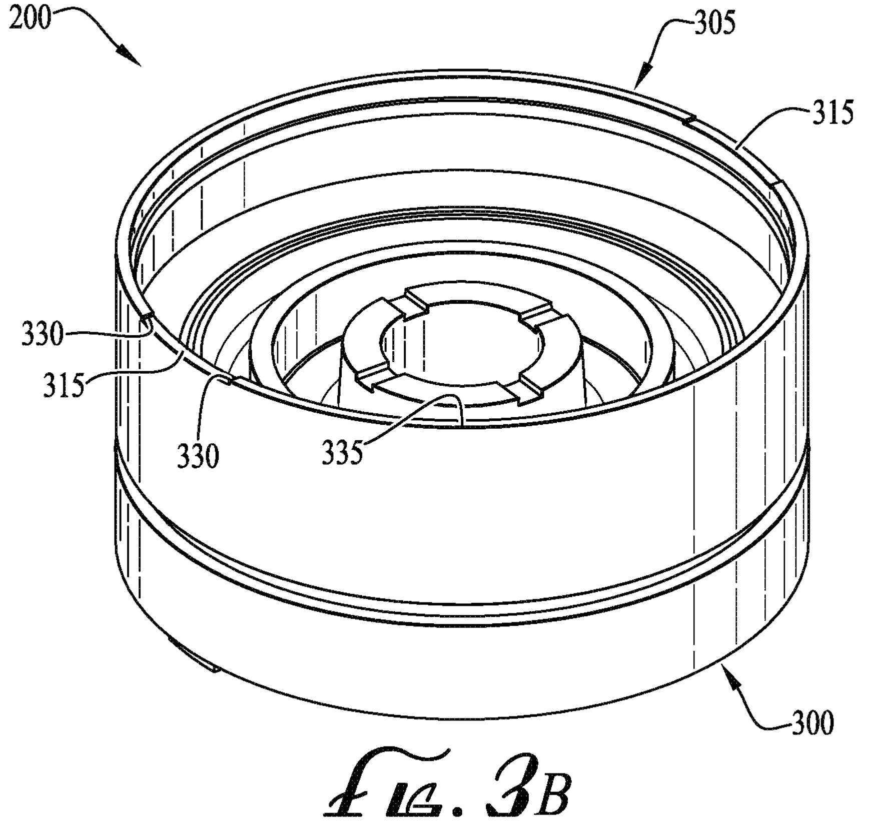
FIG. 3B is a perspective view of an exemplary diffuser with female register slots of an illustrative embodiment.

FIG. 3A and FIG. 3B illustrate diffuser 200 of an illustrative embodiment. Diffuser 200 may be made of an austenitic cast iron commonly known as Ni-Resist, stainless steel or another similar material known to those of skill in the art. As shown in FIG. 3A, rather than first side (end) 300 of diffuser 200 having a complete circumferential register, instead, diffuser 200 may include one or more male register tabs 310. First side 300 of diffuser may be one of the top end or bottom end of diffuser 200. To create male register tabs 310, a conventional male register may be machined and/or cut away, leaving only male register tabs 310. As shown in FIG. 3A, two male register tabs 310 are spaced 180° apart around first side 300 of diffuser 200. The remainder of the male register has been omitted and/or removed from diffuser 200. In one illustrative non-limiting example, each male register tab 310 may be 0.353 cm in height and 1.38 cm in circumferential length (arc length) where diffuser 200 has a 4.0-5.0 inch (about 10-12 cm) diameter. In some embodiments, each male register tab 310 may extend 10°, 13.85°, 15°, or another similar angle around the circumference of diffuser 200. As those of skill in the art may appreciate, tab 310 size may vary depending on the size and type of diffuser 200 employed, but male register tabs 310 should be long and/or thick enough such that tabs 310 do not shear when subjected to rotational torque. Male register tabs 310 may form tab wall 325 on each side of tabs 310. As shown in FIG. 3A, male register tabs 310 may be positioned on an inner diameter of rim 320, to provide a space on rim 320 outward of tab 310 on which protrusion 405 (shown in FIG. 4A) may seat. In some embodiments, a greater number of male register tabs 310 may be spaced around diffuser 200, or only a single tab 310 may be necessary.

FIG. 3B illustrates second side (end) 305 of diffuser 200 that is on the opposite end of diffuser 200 as first side 300. Where first side 300 of diffuser 200 is the top of diffuser, second side 305 may be the bottom of same diffuser 200, or vice versa. When diffusers 200 are stacked, first side 300 of a first diffuser may face second side 305 of a second diffuser 200. Rather than second side 305 having a complete circumferential female register 335, instead, one or more female register slots 315 may be included around and/or within female register 335. Female register slots 315 may be created by machining away portions of female register 335, such as about 18°, 20°, 26°, 30° or another similar angular increment around the circumference of female register 335 for each slot 315. Slot wall 330 may extend on each side of slot 315 at the edges of slot 330. As illustrated in FIGS. 3A and 3B, male register tabs 310 are on the top of diffuser 200, and female register slots 315 are on the bottom of diffuser 200, but the sides may equally be inverted with female register slots 315 on the top and male register tabs 310 on the bottom of diffuser 200. Machining of male and female registers to create male register tabs 310 and/or female register slots 315 may be simple and quick to implement, and diffusers 200 may be cast in a conventional diffuser mold. Male register tabs 310 and/or female register slots may be segments remaining from and/or cut out of conventional diffuser registers. Female register slot 315 may be longer in circumferential length than male register tab 310.

Figure 4A:
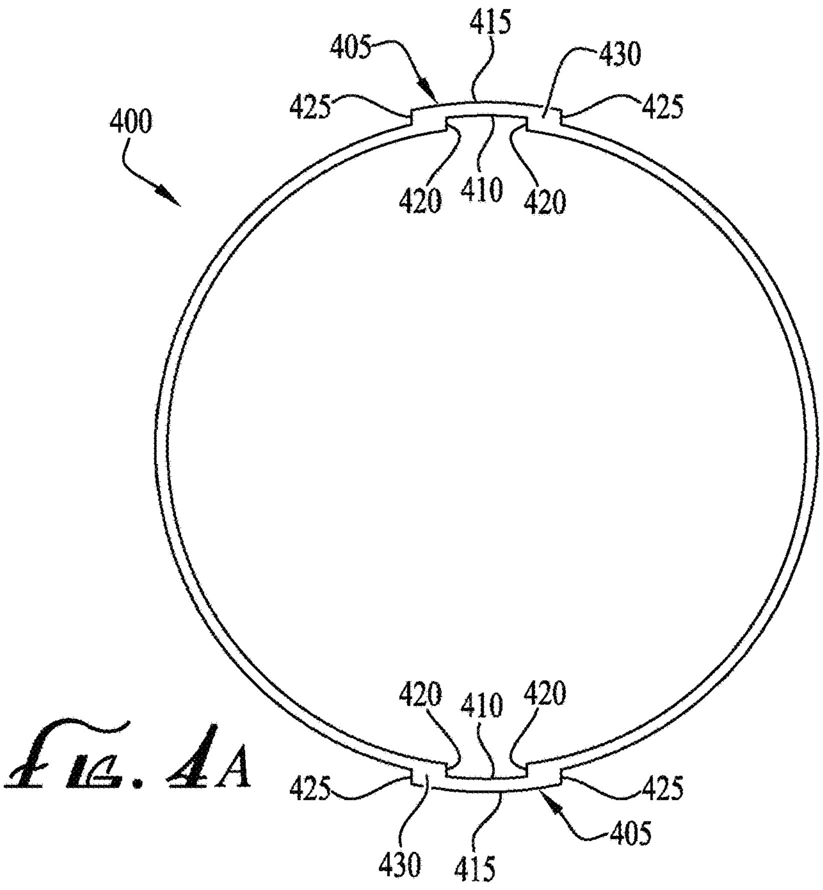
FIG. 4A is a top plan view of a coupling ring of an illustrative embodiment.
Figure 4B:
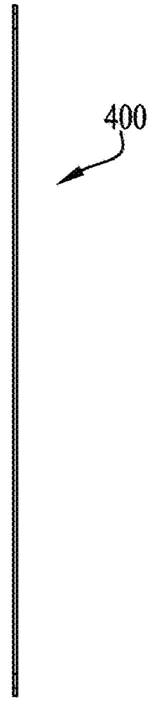
FIG. 4B is a side view of a coupling ring of an illustrative embodiment.
Figure 9:
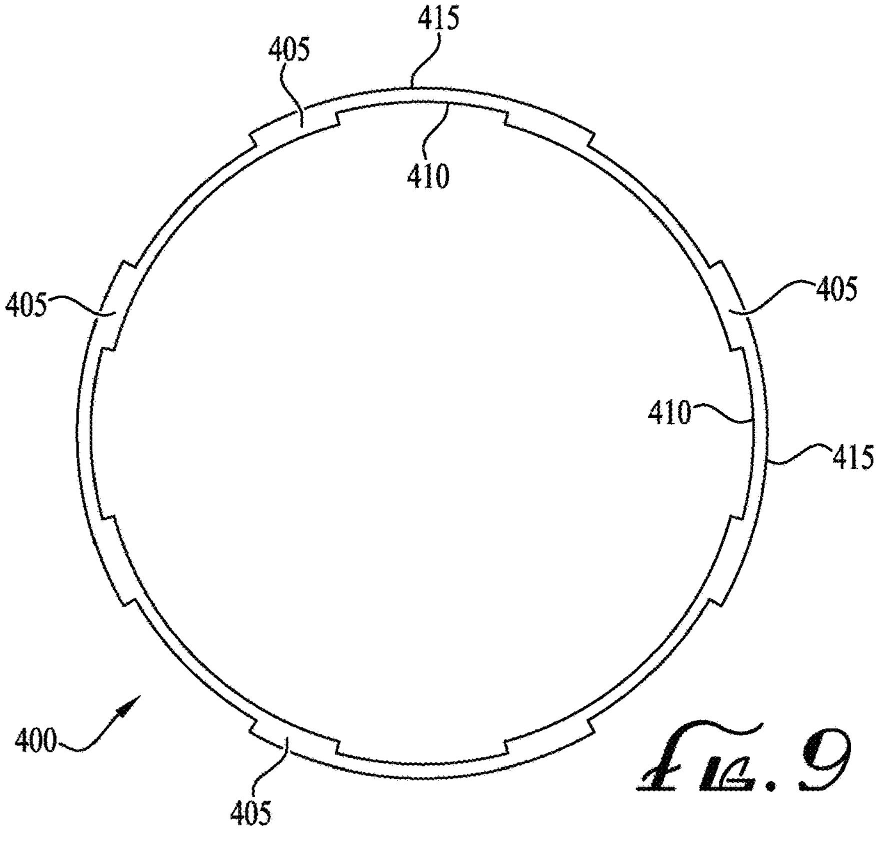
FIG. 9 is a top plan view of a coupling ring of an illustrative embodiment.

A coupling and/or lock ring may interlock between adjacent diffusers 200 in a diffuser stack, in between: a first side 300 of a first diffuser 200 with male register tabs 310, and a second side 305 of a second diffuser 200 with female register slots 315. For example, coupling ring 400 may interlock between a bottom of a first diffuser and the top of the diffuser of the previous stage. FIG. 4A and FIG. 4B illustrate an exemplary coupling ring of an illustrative embodiment. Coupling ring (lock ring) 400 may fit circumferentially around diffuser rim 320 (shown in FIG. 3A) to seat on, beneath and/or adjacent rim 320. Coupling ring 400 may include one or more projections 405. Projections 405 may be outward steps and/or arch-shaped protrusions, and each projection 405 may include inner diameter (intrados) 410 and outer diameter (extrados) 415. Intrados 410 and/or extrados 415 may be rectangular, square, round and/or rounded such that when coupling ring 400 is seated on and/or proximate rim 320, intrados 410 may closely fit around and/or mate around the outer diameter of male register tab 310, and extrados 415 may fit closely inside and/or mate with female register slot 315. Extrados 415 may be flush with and/or follow the circumference of rim 320, female register 335 and/or the outer diameter of diffuser 200. When positioned on and/or around rim 320 and/or female register 335, coupling ring 400 may interlock with both male register tabs 310 and female register slots 315. Projections 405 may be shaped to mate with shape of male register tabs 310 and/or female register slots 315, similarly to a lock and key. Angular edges such as those shown in FIG. 4A and FIG. 4B may allow a simpler machining process for the corresponding slots 315 and tabs 310. Coupling ring 400 may include one projection 405 for each male register tab 310 and female register slot 315 pairing. As illustrated in FIG. 4B, coupling ring 400 may be a thin ring, shorter than male register wall 325, that may be stamped from stainless steel, for example. FIG. 9 illustrates a coupling ring 400 with four projections 405 spaced 90° apart.

Each projection 405 may include radially extending portion 430 that includes radially extending inside surface 420 and radially extending outside surface 425. Radially extending inside surface 420 of projection 405 may abut tab wall 325. A slight clearance may extend between radially extending inside surface 420 of projection 405 and tab wall 325, which slight clearance may close should diffuser 200 attempt to rotate. Radially extending outside surface 425 of projection 405 may abut slot wall 330. A slight clearance may extend between radially extending outside surface 425 of projection 405 and slot wall 330, which slight clearance may close should diffuser 200 attempt to rotate. In an exemplary embodiment, the slight clearance may be about 0.01 cm, 0.023 cm or 0.025 cm on each side of projection 405, between slot wall 330 and radially extending outside surface 425, for example. Abutment between radially extending inside surface 420 and/or radially extending outside surface 425 of projection 405 on the one hand, and slot wall 330 and/or tab wall 325 on the other hand may prevent rotation of diffuser 200 with respect to an adjacent diffuser 200, should one of the interlocked diffusers 200 attempt to rotate.

Figure 5A:
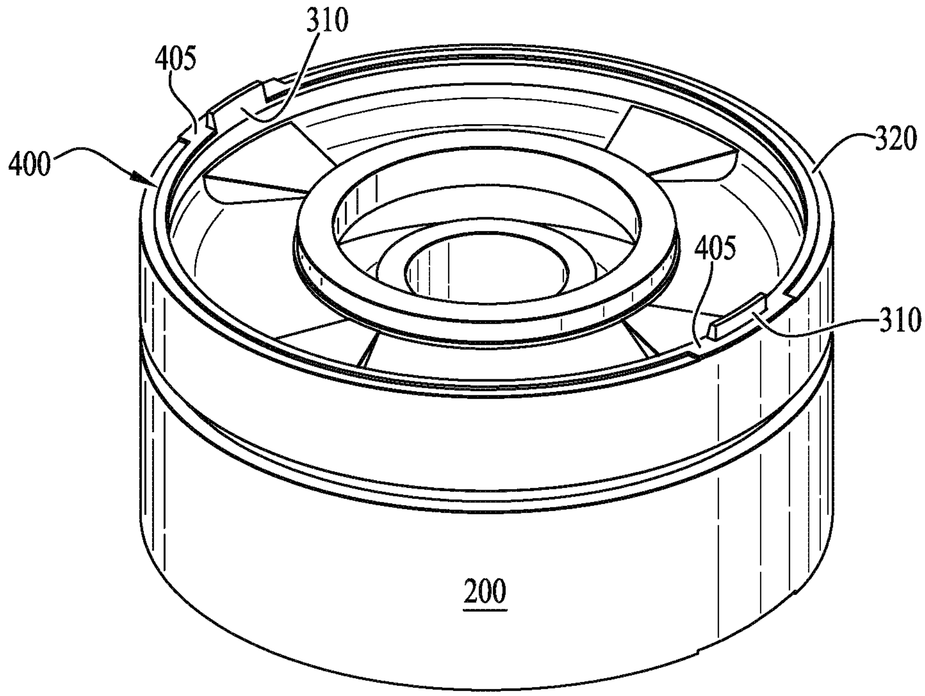
FIG. 5A is a perspective view of an exemplary diffuser with coupling ring protrusions around male register tabs of an illustrative embodiment.
Figure 5B:
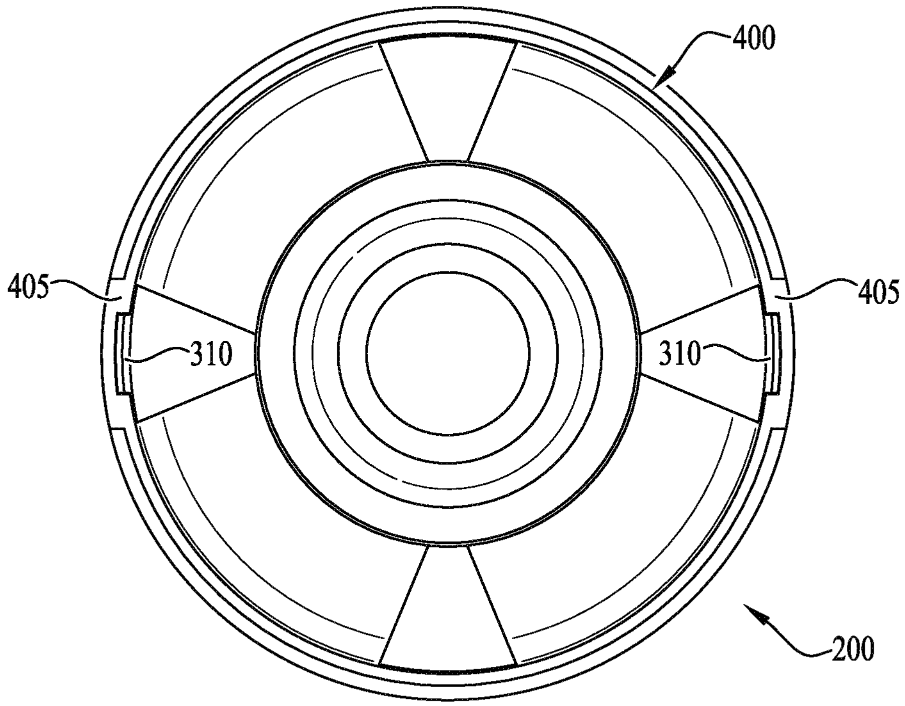
FIG. 5B is a top plan view of an exemplary diffuser with coupling ring protrusions around male register tabs of an illustrative embodiment.
Figure 6A:
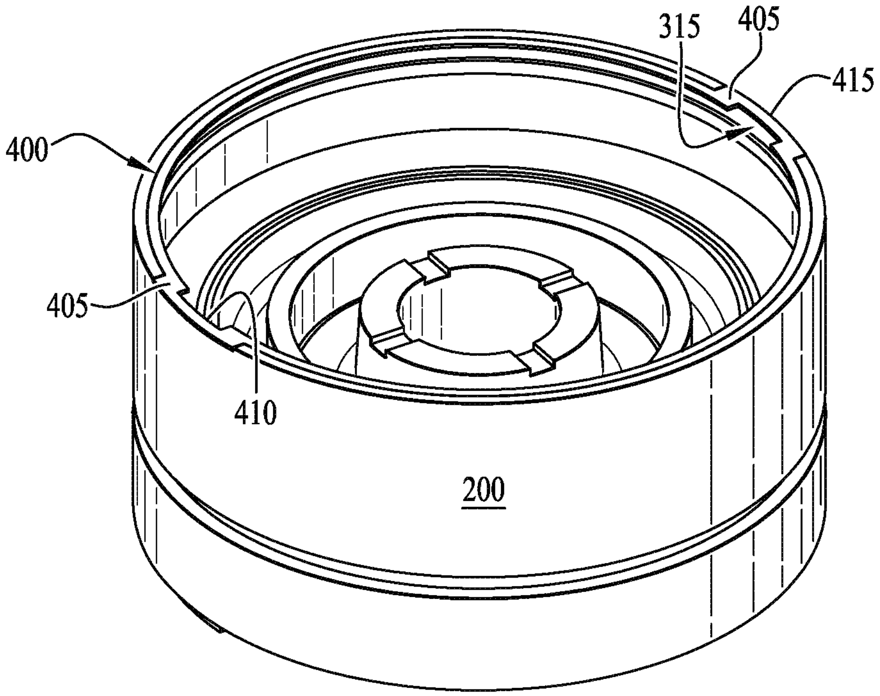
FIG. 6A is perspective view of an exemplary diffuser with coupling ring protrusions seated inside female register slots of an illustrative embodiment.
Figure 6B:
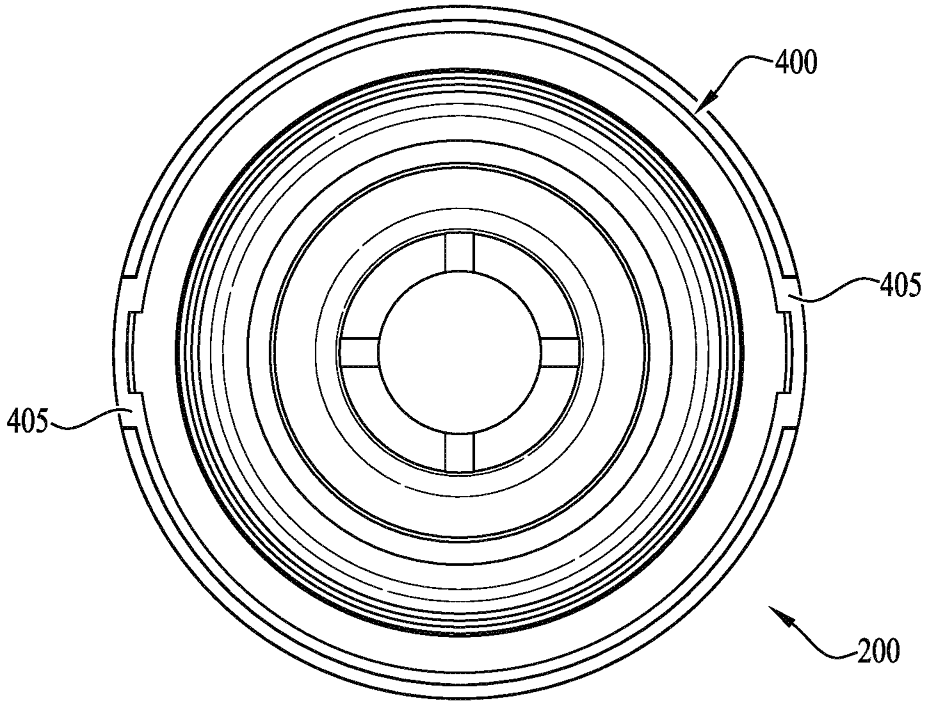
FIG. 6B is a top plan view of an exemplary diffuser with coupling ring protrusions seated inside female register slots of an illustrative embodiment.
Figure 7:
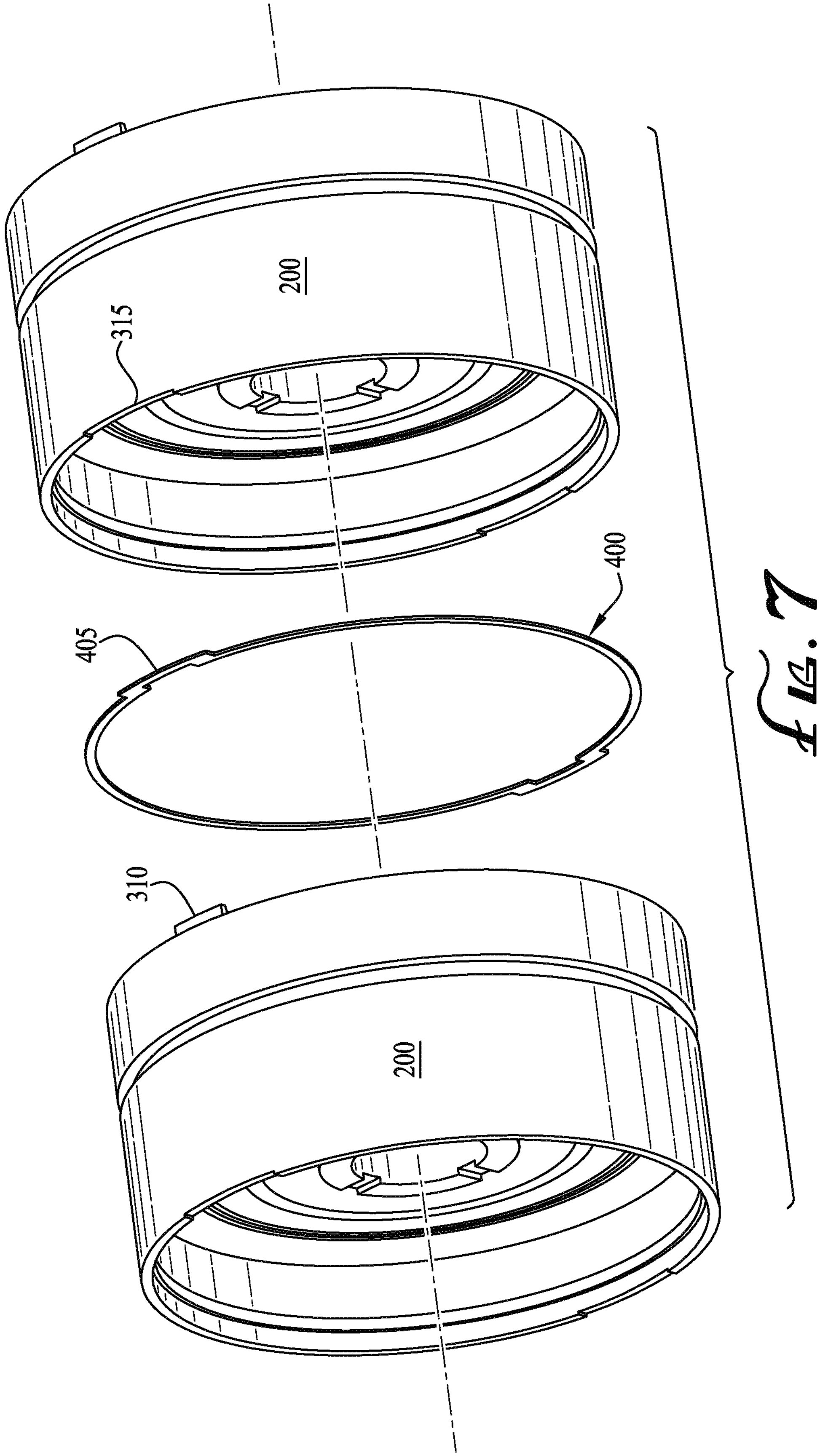
FIG. 7 is an exploded view of a diffuser anti-rotation system of an illustrative embodiment.

FIGS. 5A-5B illustrate coupling ring 400 with projections 405 mated to male register tabs 310. As shown in FIGS. 5A-5B, inner diameter 410 of projections 405 may interlock around male register tabs 310, closely fitting the shape of male register tabs 310. FIGS. 6A-6B illustrate coupling ring 400 with projections 405 mated to female register slots 315. As shown in FIGS. 6A-6B, outer diameter 415 of projections 405 may interlock inside of female register slots 315, with outer diameter 415 closely fitting the shape of female register tabs 315. As illustrated in FIGS. 6A and 6B, extrados 415 of coupling ring 400 is flush with the outer diameter of diffuser 200 and radially extending outside surface 425 of projection 405 abuts wall 330 of slot 315. FIG. 7. Illustrates an exploded view of coupling ring 400 stacked between two diffusers 200. As shown, male register tab 310 of first diffuser 200, projection 405 of coupling ring 400, and female register slot 315 may all be axially aligned when assembled, such that a single projection 405 may mate with both a male register tab 310 of a first diffuser 200 and a female register slot 315 of an adjacent diffuser 200. Coupling rings 400 may be employed between one, some or all diffusers 200 in a stack of diffusers in a multi-stage centrifugal pump, charge pump and/or gas separator. When seated in place, coupling rings 400 may prevent diffuser 200 from rotating with respect to an adjacent diffuser, reducing or eliminating the risk of diffuser spin even in high temperature and/or gassy applications.

Figure 8:
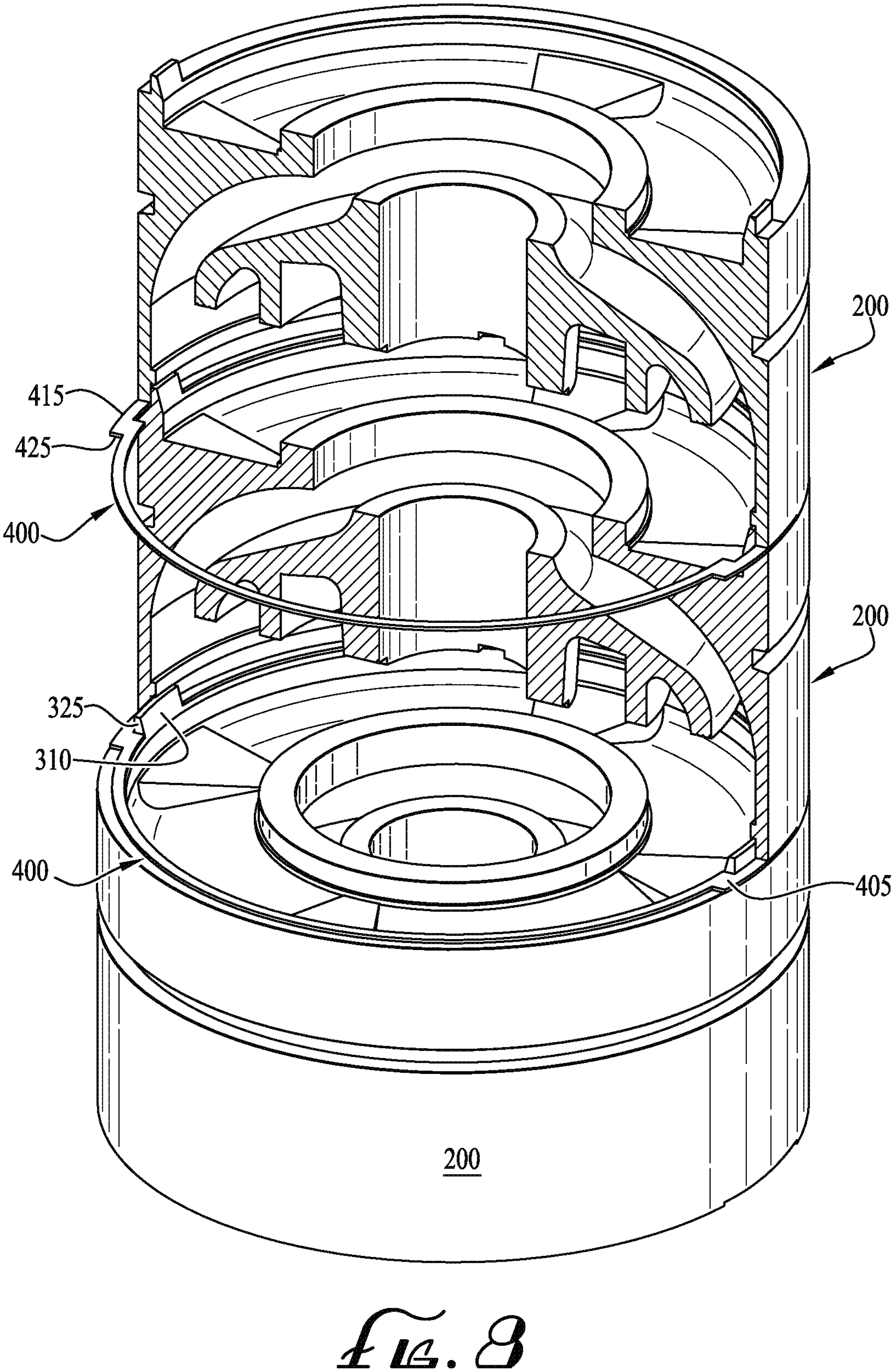
FIG. 8 is a perspective view with part cutaway of stages of a diffuser anti-rotation system of an illustrative embodiment.

FIG. 8 illustrates three diffusers 400 locked together with coupling ring 400 in between adjacent diffusers 200. In FIG. 8, part of the top two diffusers 200 are cut away for illustrative purposes. If one diffuser 200 is subject to rotational torque, coupling ring 400 secured in slots 315 and around tabs 310 may prevent rotation of such diffuser 200 with respect to an adjacent diffuser 200.

Illustrative embodiments may provide a mechanical anti-rotation lock between adjacent diffusers in a diffuser stack, preventing or reducing the likelihood of diffuser spin. Illustrative embodiments may be implemented without the need for casting complicated diffuser shapes and/or with only simple machining. Illustrative embodiments may increase the productivity of ESP assemblies operating within high temperature and/or gassy wells, such as for example SAGD wells.

A diffuser anti-rotation system and apparatus is described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. A centrifugal pump comprising:

at least two diffusers comprising a first diffuser and a second diffuser, the first diffuser adjacent the second diffuser;

each of the first diffuser and the second diffuser comprising:

a first end comprising a plurality of male register tabs dispersed around the first end; and a second end comprising a plurality of female register slots dispersed around the second end;

a coupling ring extending circumferentially between the first diffuser and the second diffuser, the coupling ring comprising a plurality of projections, each projection of the plurality of projections mated:

around one of the male register tabs of the first diffuser; and inside one of the female register slots of the second diffuser.

2. The centrifugal pump of claim 1, further comprising a first impeller rotating with a shaft of the centrifugal pump inside the first diffuser, and a second impeller rotating with the shaft of the centrifugal pump inside the second diffuser.

3. The centrifugal pump of claim 1, wherein the coupling ring interlocks the first diffuser and the second diffuser against rotation.

4. The centrifugal pump of claim 1, wherein a radially extending portion of each projection of the coupling ring abuts a wall of the one of the male register tabs on a first side of the radially extending portion, and abuts a wall of the one of the female register slots on a second side of the radially extending portion.

5. The centrifugal pump of claim 1, wherein the each projection comprises an arch, and an intrados of the arch surrounds the male register tab of the first diffuser, and an extrados of the arch is flush with and follows an outer diameter of the first diffuser.

6. The centrifugal pump of claim 1, wherein the coupling ring seats around a circumference of a rim of one of the first diffuser and the second diffuser.

7. The centrifugal pump of claim 1, wherein the at least two diffusers are compressed in a stack.

8. The centrifugal pump of claim 1, wherein there are two male register tabs in the plurality of male register tabs spaced 180° apart, two female register slots in the plurality of female register slots and two protrusions in the plurality of protrusions.

9. The centrifugal pump of claim 1, wherein each male register tab is axially aligned with a female register slot.

10. A diffuser anti-rotation system comprising:

a first diffuser;

an adjacent diffuser; and a circumferential coupling ring interlocked between a top of the first diffuser and a bottom of the adjacent diffuser, wherein the top of the first diffuser comprises at least one male register tab, the bottom of the adjacent diffuser has at least one female register slot, and the coupling ring interlocks with the at least one male register tab and the at least one female register slot, and wherein one of the at least one male register tabs and one of the at least one female register slots are aligned axially and one projection from the coupling ring interlocks with both the one of the at least one male register tabs and the axially aligned one of the at least one female register slots.

11. The diffuser anti-rotation system of claim 10, wherein the one projection mates around the one of the at least one male register tabs and inside the one of the at least one female register slots.

12. The diffuser anti-rotation system of claim 10, further comprising a first impeller mated with and rotating within the first diffuser, and a second impeller mated with and rotating within the adjacent diffuser.

13. The diffuser anti rotation system of claim 12, wherein the interlocked coupling ring is configured to prevent rotation of the first diffuser with respect to the adjacent diffuser.

14. The diffuser anti-rotation system of claim 12, wherein the diffusers with mated impellers form a multi-stage centrifugal pump.

15. The diffuser anti-rotations system of claim 10, comprising a plurality of first diffusers and a plurality of adjacent diffusers forming a diffuser stack compressed by a centralizer bearing.

16. The diffuser anti-rotation system of claim 10, wherein the bottom of the first diffuser comprises at least one male register tab, the top of the adjacent diffuser has at least one female register slot, and the coupling ring interlocks with the at least one male register tab and the at least one female register slot.

* * * * *